(12) United States Patent
Oigawa et al.

(10) Patent No.: US 12,498,214 B2
(45) Date of Patent: Dec. 16, 2025

(54) INFORMATION PROCESSING APPARATUS, MOVABLE BODY CONTROL SYSTEM, AND INFORMATION PROCESSING METHOD

(71) Applicant: CANON KABUSHIKI KAISHA, Tokyo (JP)

(72) Inventors: Makoto Oigawa, Tokyo (JP); Kazuya Nobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 18/489,963

(22) Filed: Oct. 19, 2023

(65) Prior Publication Data

US 2024/0147087 A1 May 2, 2024

(30) Foreign Application Priority Data

Oct. 26, 2022 (JP) ................. 2022-171112

(51) Int. Cl.
| | |
|---|---|
| *G01B 11/22* | (2006.01) |
| *G06T 7/579* | (2017.01) |
| *G06T 7/593* | (2017.01) |
| *H04N 13/106* | (2018.01) |
| *H04N 25/58* | (2023.01) |

(52) U.S. Cl.
CPC .............. *G01B 11/22* (2013.01); *G06T 7/579* (2017.01); *G06T 7/593* (2017.01); *H04N 13/106* (2018.05); *H04N 25/58* (2023.01)

(58) Field of Classification Search
CPC .. H04N 13/156; H04N 13/122; H04N 13/128; H04N 13/133; H04N 13/15; H04N 13/106; G01B 11/22; G06T 7/593

See application file for complete search history.

(56) References Cited

U.S. PATENT DOCUMENTS

| 10,466,048 B2 | 11/2019 | Oigawa |
| 10,900,770 B2 | 1/2021 | Nobayashi |
| (Continued) | | |

FOREIGN PATENT DOCUMENTS

| EP | 2498502 A2 * | 9/2012 | ........... H04N 13/128 |
| EP | 4067815 A1 | 10/2022 | |
| (Continued) | | | |

OTHER PUBLICATIONS

Extended European Search Report issued in EP Patent Application No. 23205804.0, dated Mar. 26, 2024, pp. 1-8.

(Continued)

*Primary Examiner* — David N Werner

(74) *Attorney, Agent, or Firm* — Carter, DeLuca & Farrell LLP

(57) ABSTRACT

An information processing apparatus acquires a first parallax image and a second parallax image, which are parallax images that are a group of images having parallax with each other and captured by an imaging unit with different exposure conditions, acquires reliability, which is an accuracy of a parallax amount of the parallax images, for the first parallax image and the second parallax image, and selects the parallax images for generating information about a distance from a plurality of the parallax images including the first parallax image and the second parallax image, based on the reliability.

17 Claims, 9 Drawing Sheets

(56) References Cited

U.S. PATENT DOCUMENTS

| | | | |
|---|---|---|---|
| 2014/0294289 A1* | 10/2014 | Nakatani | H04N 13/106 |
| | | | 382/154 |
| 2015/0139421 A1* | 5/2015 | Cordeiro De Oliveira Barros | H04L 9/0838 |
| | | | 380/255 |
| 2016/0273909 A1* | 9/2016 | Nobayashi | G06T 5/50 |
| 2018/0014001 A1* | 1/2018 | Lee | H04N 13/156 |
| 2018/0211400 A1* | 7/2018 | Park | G06V 30/413 |
| 2019/0294899 A1* | 9/2019 | Okubo | G06T 7/593 |
| 2022/0358667 A1* | 11/2022 | Tsubaki | G06T 7/593 |

FOREIGN PATENT DOCUMENTS

| | | |
|---|---|---|
| JP | 3675039 B2 | 7/2005 |
| JP | 2015-073185 A | 4/2015 |
| JP | 2016-173322 A | 9/2016 |
| JP | 6408372 B2 | 10/2018 |
| JP | 2019-168821 A | 10/2019 |
| WO | WO-2018021657 A1 * 2/2018 ........... H04N 13/128 |

OTHER PUBLICATIONS

Notice of Reasons for Refusal issued by the Japanese Patent Office on Feb. 6, 2024 in corresponding JP Patent Application No. 2022-171112, with English translation.

Office Action issued by the European Patent Office on May 13, 2025 in corresponding EP Patent Application No. 23205804.0.

\* cited by examiner ing to the first and sixth embodiments.

INFORMATION PROCESSING APPARATUS, MOVABLE BODY CONTROL SYSTEM, AND INFORMATION PROCESSING METHOD

BACKGROUND

Technical Field

One of the aspects of the embodiments relates to a technology for measuring a distance using a pair of images (parallax images) having a parallax.

Description of Related Art

A moving object such as an automobile has a distance measuring apparatus that acquires parallax images using an image pickup apparatus and obtains information about a distance based on the stereo (stereoscopic) distance measuring principle. Some image pickup apparatuses can obtain a High Dynamic Range (HDR) image with an expanded dynamic range by combining a plurality of image data obtained by imaging with different exposure conditions. Japanese Patent No. 6408372 discloses an image pickup apparatus in which the image sensor can acquire a parallax image by having a pixel configuration that can acquire signals having a phase difference with each other, and can acquire images with different exposure conditions using high-sensitivity pixels and low-sensitivity pixels.

However, Japanese Patent No. 6408372 is silent about a selection of exposure conditions in calculating a parallax between parallax images. It is thus difficult to determine which of parallax images obtained with high-sensitivity pixels, parallax images obtained with low-sensitivity pixels, and parallax images as HDR images are most suitable for calculating a parallax amount.

SUMMARY

An information processing apparatus according to one aspect of the embodiment includes a memory storing instructions, and a processor configured to execute the instructions to acquire a first parallax image and a second parallax image, which are parallax images that are a group of images having parallax with each other and captured by an imaging unit with different exposure conditions, acquire reliability, which is an accuracy of a parallax amount of the parallax images, for the first parallax image and the second parallax image, and select the parallax images for generating information about a distance from a plurality of the parallax images including the first parallax image and the second parallax image, based on the reliability. A movable body control system including the above information processing apparatus constitutes another aspect of the embodiment. An information processing method corresponding to the above information processing apparatus constitutes another aspect of the embodiment. A storage medium storing a program that causes a computer to execute the above information processing method constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

First Embodiment

A first embodiment will discuss a distance measuring apparatus that acquires information about a distance from a parallax amount between a pair of images having parallax acquired for each frame by a stereo image pickup apparatus (stereoscopic or stereo camera). The distance measuring apparatus according to this embodiment is used for a digital camera, a digital video camera, an in-vehicle (on-board) sensor device, a robot vision sensor device, and the like.

Figure 1:
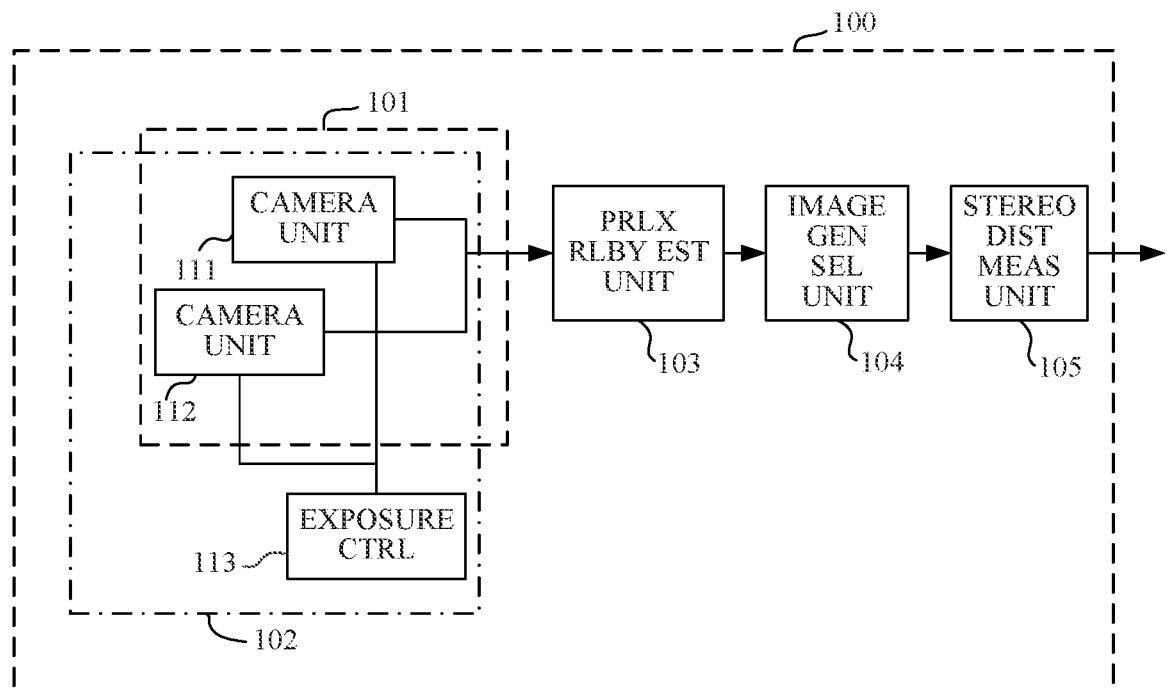
FIG. 1 is a block diagram illustrating the configuration of a distance measuring apparatus according to a first embodiment.

FIG. 1 illustrates the configuration of a distance measuring apparatus 100 as an information processing apparatus according to this embodiment. The distance measuring apparatus 100 includes a stereo camera (imaging unit) 101, an exposure control image acquiring unit (image acquiring unit) 102, a parallax reliability estimating unit (reliability acquiring unit) 103, an image generation selecting unit (selecting unit) 104, and a stereo distance measuring unit (distance information generating unit) 105. The stereo camera 101 has two camera units (imaging units) 111 and 112 arranged in parallel with a predetermined distance (base length) from each other. An imaging angle of view of each of the camera units 111 and 112 is set so as to include a common angle of view range.

Figure 11:
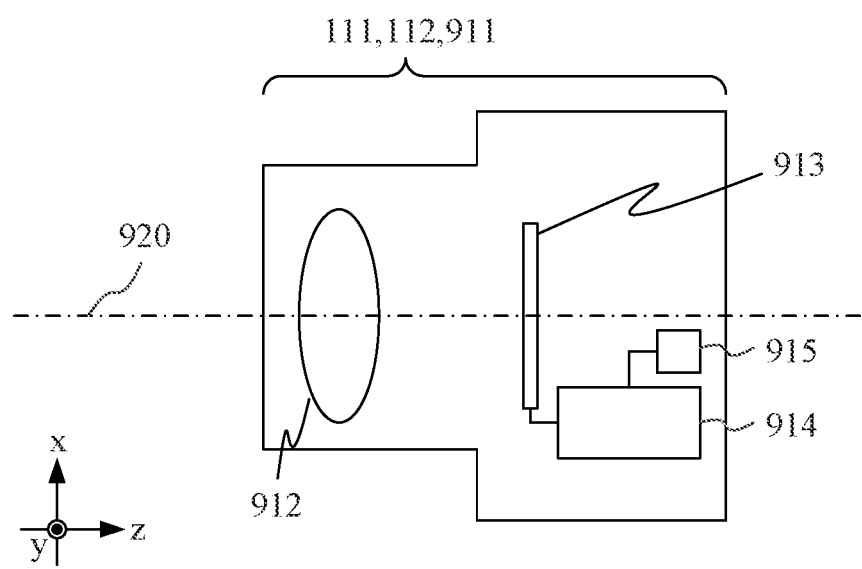
FIG. 11 illustrates a configuration of a camera unit according to the first and sixth embodiments.

FIG. 11 illustrates the configuration of the camera units 111 and 112. Each camera unit includes an imaging optical system 912, an image sensor 913, an image processing unit 914, and an image memory 915. The image sensor 913 is a photoelectric conversion element such as a CMOS sensor or a CCD sensor, and outputs an image signal by photoelectrically converting (imaging) an object image formed by the imaging optical system 912. Reference numeral 920 denotes an optical axis of the imaging optical system.

The image processing unit 914 performs various image processing for an image signal read out of the image sensor 913 to generate image data (simply referred to as an image hereinafter). The generated image is stored in the image memory 915 or transmitted to the parallax reliability estimating unit 103 in the subsequent stage through a signal transmitter (not illustrated). The camera unit 111 performs imaging from a first viewpoint to generate a first image, and the camera unit 112 performs imaging from a second viewpoint different from the first viewpoint to generate a second image. The first image and the second image form a pair of images (stereo images) having parallax.

The exposure control image acquiring unit 102 includes the camera units 111 and 112 and an exposure control unit (exposure control unit) 113. The exposure control unit 113 controls the exposure amounts of the camera units 111 and 112 at the same time. Here, the exposure control unit 113 changes the exposure times as the exposure conditions in the imaging of the camera units 111 and 112. Thereby, an image with a first exposure time (referred to as a long-time image hereinafter) and an image with a second exposure time (referred to as a short-time image hereinafter) shorter than the first exposure time, which are images having different exposure conditions, can be generated in the camera units 111 and 112. Two long-second images with parallax and two short-second images with parallax generated by the camera units 111 and 112 will be respectively referred to as a pair of long-second images (first parallax images) and a pair of short-second images (second parallax images) in the following description.

Figure 2:
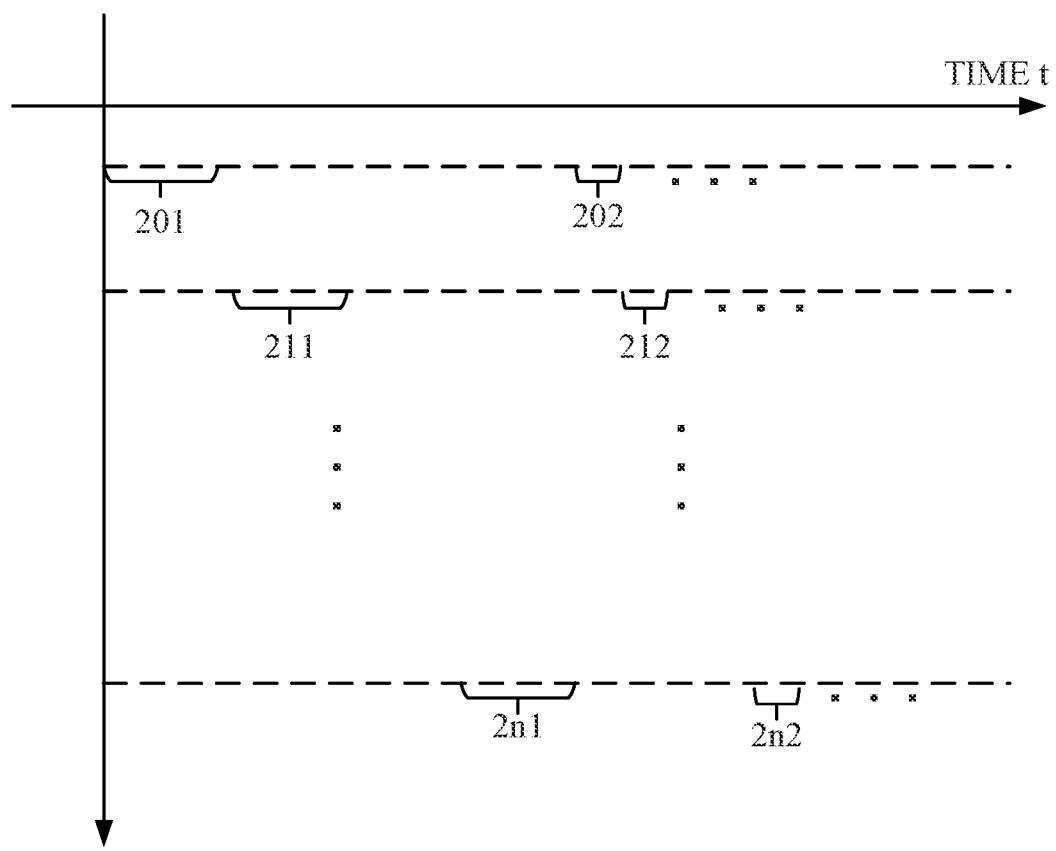
FIG. 2 is a timing chart illustrating exposure timings of an image sensor according to the first embodiment.

FIG. 2 illustrates the exposure time for each pixel row in the image sensor in each camera unit. A horizontal axis represents time t, and a vertical axis represents pixel row c of the image sensor. The pixel row c serves as a readout row for reading out image signals for each pixel row. In a case where an image signal of a first exposure time 201 and an image signal of a second exposure time 202 are obtained in the first readout row, an image signal of a first exposure time 211 and an image signal of a second exposure time 212 are acquired in the next readout row. Thus, in a case where an image signal of a first exposure time $2n1$ and an image signal of a second exposure time $2n2$ are obtained in the final readout row, a long-second image is acquired by combining image signals of different pixel rows using the first exposure times 201, 211, ..., and $2n1$. A short-second image is acquired by combining image signals of different pixel rows using the second exposure times 202, 212, ..., and $2n2$.

The exposure control unit 113, the parallax reliability estimating unit 103, the image generation selecting unit 104, and the stereo distance measuring unit 105 include calculation processing units (computers such as CPUs) including one or more semiconductor integrated circuits.

The pair of long-second images and a pair of short-second images obtained from the camera units 111 and 112 are transmitted to the parallax reliability estimating unit 103. The parallax reliability estimating unit 103 estimates the long-second parallax reliability, which is the accuracy of the parallax amount calculated from the pair of long-second images by the following reliability determining processing. The parallax reliability estimating unit 103 estimates the short-second parallax reliability, which is the reliability of the parallax amount calculated from the pair of short-second images, through the same processing. The image generation selecting unit 104 that has received these long-second and short-second parallax reliabilities selects one of the pair of long-second images, the pair of short-second images, and the pair of HDR images (combined images) as a pair of images (parallax images: referred to as parallax calculation images hereinafter) for calculating a parallax amount for generating information about a distance. The pair of HDR images include a first HDR image generated by combining (blending) the long-term image and the short-term image obtained from the camera unit 111, and a second HDR image the long-term image and the short-term image obtained from the camera unit 112.

The stereo distance measuring unit 105 calculates a parallax amount using a known method and a pair of parallax calculation images selected by the image generation selecting unit 104, and further calculates a distance value using the parallax amount. The distance measuring apparatus 100 performs the above processing for image signals from all pixels of the image sensor to generate a distance image including information on the distance to the object within the imaging angle of view. The information about the distance may be information indicating the distance itself or may be information that can be converted into distance using a reference table, a conversion formula, or the like.

More specifically, the stereo distance measuring unit 105 performs preprocessing including geometric correction processing, light amount correction processing, and noise reduction processing using bandpass filter processing for the input pair of images, calculates a parallax amount from the pair of preprocessed images and converts an obtained parallax amount into a distance value. In this parallax amount calculation processing, in one of the pair of images, a collation area centered on the coordinates of a target point is set, in the other image, a reference area having the same shape as the collation area centered on the reference point coordinates is sequentially moved and a correlation value is calculated. Then, a position shift amount between the target point coordinates and the reference point coordinates, which have the highest correlation, is set as the parallax amount. The correlation value calculating method can use Sum of Squared Difference (SSD) for evaluating the sum of squares of the difference of the image signals, Sum of Absolute Difference (SAD) for evaluating the absolute value of the difference, or the like. Although set values of the target point coordinates and the reference point coordinates are integers, the parallax amount can be calculated with sub-pixel accuracy by peak fitting of the extreme value of the correlation. Then, in the parallax amount calculation processing, the calculated parallax amount is converted into a distance value L using a geometric relational expression using a preset base length W between the camera units 111 and 112 and the focal length f of each camera unit. A distance image is generated by calculating the parallax amount and the distance value for all pixels of the image sensor in this manner.

Figure 3:
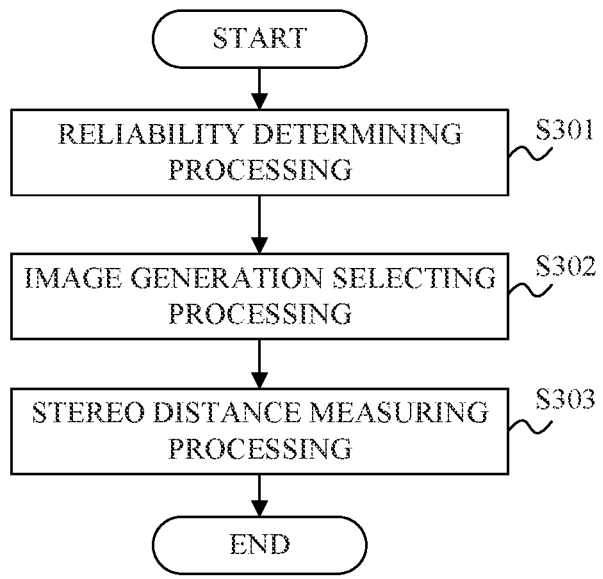
FIG. 3 is a flowchart illustrating distance measuring processing according to the first embodiment.

A flowchart in FIG. 3 illustrates distance measuring processing (distance measuring method) executed by a computer (exposure control unit 113, parallax reliability estimating unit 103, image generation selecting unit 104, and stereo distance measuring unit 105) in the distance measurement apparatus according to a computer program. S stands for the step.

In S301, the parallax reliability estimating unit 103 performs reliability determining processing for the acquired input images (a pair of long-second images and a pair of short-second images). In the reliability determination processing, contrast reliability, saturation reliability, and motion blur reliability, which represent reliability as the accuracy of the parallax amount calculated in the pair of images, are calculated.

Contrast reliability Conf_c is the reliability regarding the contrast of the object (image), and is calculated by the following equation:

$$\text{Conf\_c}(x, y) = \frac{C(x, y)}{\text{noise}(x, y)}$$

$$C(x, y) = \sqrt{\frac{1}{Nhv} \sum_h \sum_v (I(h, v) - Iave)^2}$$

$$\text{noise}(x, y) = q\sqrt{Iave}$$

$$Iave = \frac{1}{Nhv} \sum_h \sum_v I(h, v)$$

Figure 4:
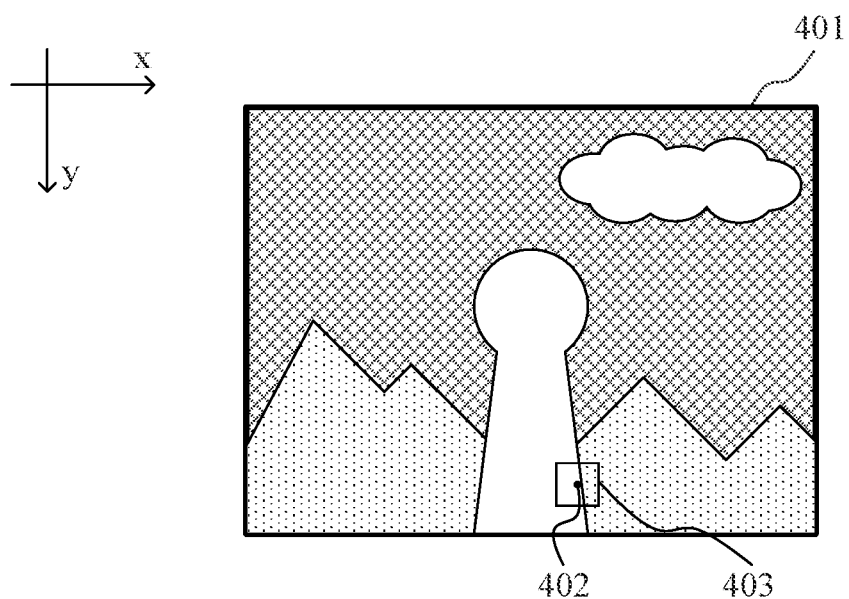
FIG. 4 illustrates an example of an input image according to the first embodiment.

FIG. 4 illustrates an example of an input image 401. An input image 401 is one of a pair of images, and in FIG. 4, a collation area or a reference area (referred to as collation/reference area hereinafter) 403 is illustrated, which is centered on target point coordinates or reference point coordinates (referred to as target point/reference point coordinates hereinafter) (x, y) 402. The following reliability may be calculated for at least one of the pair of images.

To calculate the contrast reliability Conf_c, first, contrast C(x, y) of a signal luminance value I within the collation/reference area 403 centered on the target point/reference point coordinates (x, y) 402 is obtained. x and h indicate horizontal coordinates in the input image, and y and v indicate vertical coordinates. Iave indicates an average value of the signal luminance values I within the collation/reference area 403.

Next, the estimated noise amount noise(x, y) in the collation/reference area 403 is calculated. q is a coefficient previously prepared based on the characteristic of the image sensor. The contrast reliability Conf_c(x, y) of the target point/reference point coordinates (x, y) 402 is calculated from a ratio between the contrast C(x, y) and the estimated noise amount noise(x, y). The contrast reliability of the input image can be obtained by performing these calculations for all pixels. Thus, the contrast reliability Conf_c of each of the pair of long-term images and the pair of short-term images is obtained.

In calculating the correlation value in calculating the parallax amount, in a case where the contrast in the colla-tion/reference area 403 is high or a noise amount is small, the correlation peak becomes sharp, and the parallax amount can be calculated with high reliability. Therefore, the higher the contrast reliability Conf_c is, the higher the reliability of the calculated parallax amount is determined to be high reliability.

Saturation reliability Conf_s is the reliability regarding luminance saturation for determining whether or not there is a pixel outputting luminance saturation or a signal luminance value corresponding to it in the collation/reference area 403, and is defined as follows:

$$\text{Conf\_s}(x, y) = \begin{cases} 0 & I(h, v) \geq Ith \\ 1 & I(h, v) < Ith \end{cases}$$

That is, in a case where there is a pixel whose signal luminance value I(h, v) is equal to or greater than signal luminance threshold Ith in the collation/reference area 403, the low reliability of 0 is set, and in a case where there is no pixel whose signal luminance value is equal to or greater than the signal luminance threshold Ith, the high reliability of 1 is set. By performing this determination for all pixels, the saturation reliability of the input image can be obtained. In a case where there is a pixel outputting luminance saturation or a signal luminance value corresponding to it in the collation/reference area 403, an area with luminance saturation in outputting the correlation value may be a pseudo-texture different from the texture of the object, and an erroneous correlation value may be calculated. In this case, a parallax amount different from the parallax amount according to the object distance is calculated. Therefore, in a case where there is no luminance saturation area within the collation/reference area 403, the reliability is determined to be high.

Motion blur reliability Conf_m is a reliability regarding motion blur for determining whether or not there is a pixel significantly affected by motion blur in the collation/reference area 403. Conf_m(x, y) is set to an amplitude of a bandpass filtered image obtained by bandpass filtering signal luminance value I(h, v) within the collation/reference area 403 for the target point coordinates (x, y). The transmission band of the band-pass filter is properly set to a spatial frequency band in which the influence of motion blur should be taken into consideration. More specifically, it is set according to the moving speed of the distance measuring apparatus, the moving speed of the main object, and the exposure time for acquiring each second image. In a case where the motion blur in the collation/reference area 403 is large, the correlation peak becomes dull due to deterioration of the texture of the object and movement of the center of gravity of the object during exposure. That is, the calculation accuracy of the parallax amount is lowered. Therefore, the smaller the amplitude of the spatial frequency band is for which the influence of motion blur is to be considered, the greater the influence of motion blur is. The larger the motion blur reliability Conf_m is, the reliability is determined to be high.

The contrast reliability, saturation reliability, and motion blur reliability are integrated as in the following equation to determine the reliability of the parallax amount for each collation/reference area.

Conf_all(x,y)=α·Conf_c(x,y)+β·Conf_s(x,y)+γ·Conf_m(x,y)

where α, β, and γ are weighting factors.

Next, in S302, the image generation selecting unit 104 performs image generation selecting processing that compares integrated reliability determination value Conf_all calculated in S301 and generates a pair of images whose parallax amount is estimated to be highly reliable for each collation/reference area. More specifically, the image generation selecting unit 104 compares the reliability determination value Conf_all for each collation/reference area of the pair of long-second images with the reliability determination value Conf_all for each collation/reference area of the pair of short-second images, and selects the pair of images having collation/reference areas with higher reliability as the parallax calculation images. That is, a parallax calculation image is selected for each collation/reference area.

In a case where the reliability determination values Conf_all are compared and no significant difference is recognized, the pair of HDR images described above is selected as the parallax calculation image.

Next, in S303, the stereo distance measuring unit 105 performs stereo distance measuring processing that calculates a parallax amount for each collation/reference area using the parallax calculation image selected in S302, and calculates a distance value to calculate a distance image.

Thus, selecting a pair of images suitable to calculate a parallax amount from a plurality of pairs of images with different exposure conditions based on the parallax reliability can perform highly accurate distance measurement.

This embodiment may alternately assign the long exposure time and the short exposure time to each pixel row of the image sensor, and generate a long-second image and a short-second image by driving the pixel rows at the same readout clock frequency, reading out image signals, and combining image signals every other pixel row. Thereby, a shift of the exposure centers of gravity between the long-second image and the short-second image can be suppressed.

The exposure conditions may be varied by providing a first pixel and a second pixel having mutually different exposure sensitivities in the image sensor. Thereby, even if the exposure time is the same, a first exposure image as a high-sensitivity image corresponding to a long-second image and a second exposure image as a low-sensitivity image corresponding to a low-second image can be obtained at the same time, and the influence of different exposure times between images can be avoided.

The contrast reliability Conf_c may be calculated using only the contrast C. The motion blur reliability Conf_m may be evaluated as a frequency analysis, for example, by Fourier-transforming the signal value of the collation/reference area for which the motion blur reliability Conf_m is to be obtained, and by evaluating it using the amplitude of the target spatial frequency band. Thereby, each frequency component can be separated and evaluated, so that the accuracy of distance measurement can be further improved.

The distance measuring accuracy may be further improved by calculating the reliability of each of the pair of images, and by selecting as a parallax calculation image one of the pair of images which has a higher overall reliability evaluation (average value, maximum value, etc.).

In generating an HDR image by blending a long-second image and a short-second image, a blending ratio may be determined using a ratio of these contrast reliabilities. Since the contrast reliability affects the calculation accuracy of the parallax amount under the same conditions for both the long-second image and the short-second image, the blend ratio may be determined as described above from the viewpoint of improving distance measurement accuracy. For example, where k=contrast reliability of long-second image/contrast reliability of short-second image is k, an HDR image may be generated as follows:

$$\text{HDR image}=k/(1+k)\times\text{long image}+1/(1+k)\times\text{short image}$$

In selecting the parallax calculation images, a pair of images may be selected for each area in which correlation calculation for calculating the parallax amount is performed. Thereby, a proper parallax amount can be calculated according to the scene to be imaged, such as the type and arrangement of the object, and the distance measurement accuracy can be improved.

A parallax amount for each of the first pair and second pair of exposure images under mutually different exposure conditions is calculated prior to the stereo distance measuring processing, then the pair of images for the distance measuring calculation are selected based on the reliability, and distance measurement may be performed using a parallax amount in the selected pair of images. This processing may calculate parallax amounts for the entire pairs of images and select the parallax amount for the distance measurement from the standpoint of implementation cost rather than calculating a parallax amount by switching the pair of images for each coordinate (x, y) using a logic circuit such as an Field Programmable Gate Array (FPGA).

Second Embodiment

A second embodiment selects a parallax calculation image using the saturation reliability, the motion blur reliability, and the contrast reliability described in the first embodiment in this order. The configuration of the distance measuring apparatus is the same as that of the distance measuring apparatus 100 illustrated in FIG. 1, and those elements, which are corresponding elements in the first embodiment, will be designated by the same reference numerals. The distance measuring processing is similar to that illustrated in the flowchart of FIG. 3 except for S301.

Figure 5:
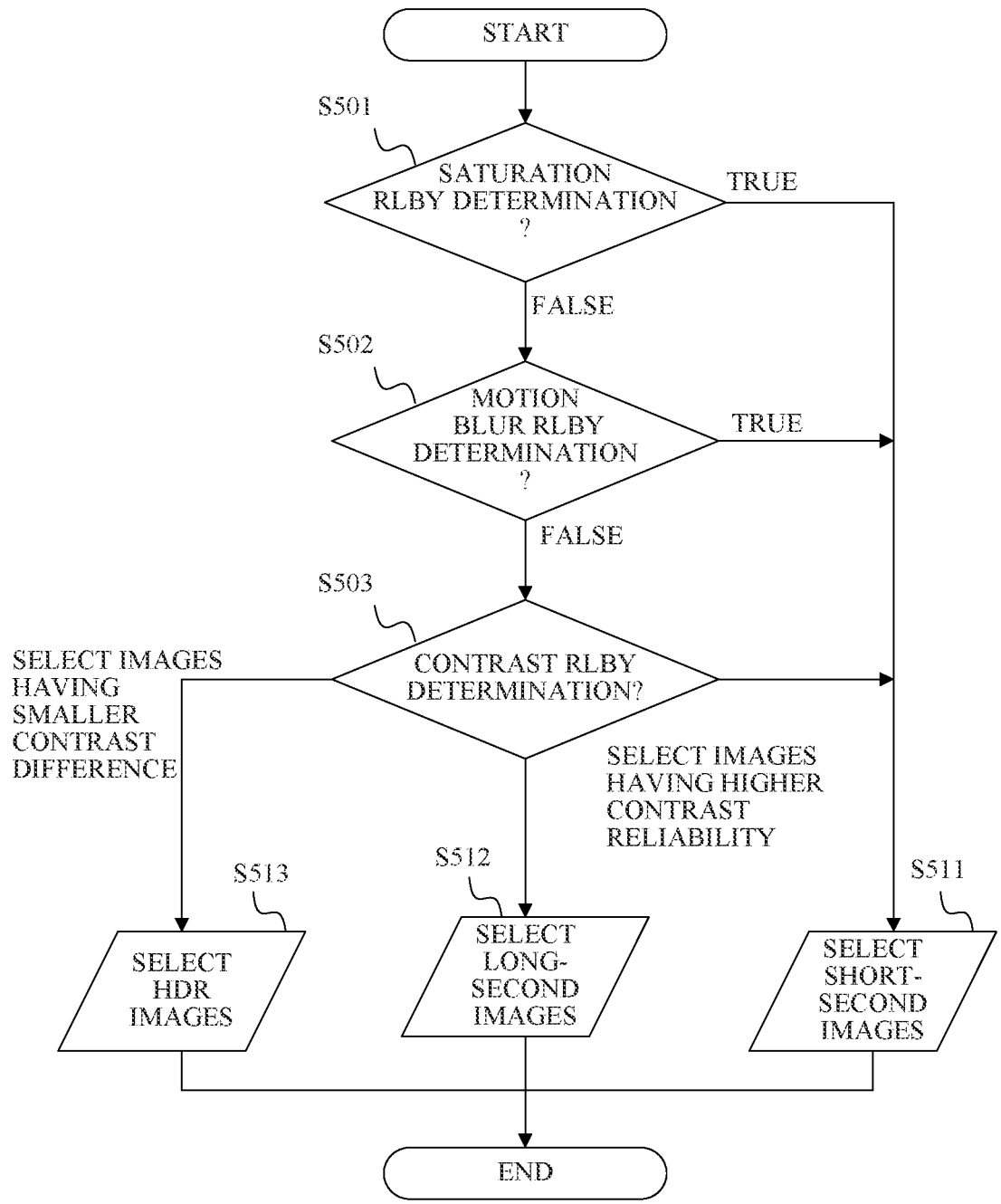
FIG. 5 is a flowchart illustrating reliability determining processing according to a second embodiment.

A flowchart in FIG. 5 illustrates reliability determining processing executed by the parallax reliability estimating unit 103 according to this embodiment instead of S301 in FIG. 3.

In S501, the parallax reliability estimating unit 103 calculates saturation reliability Conf_s for each of a pair of long-second images and a pair of short-second images as input images. Then, the parallax reliability estimating unit 103 determines whether or not there is a collation/reference area with Conf_s=0 in each of the long-second image and the short-second image, that is, whether or not there is a luminance saturation area. In a case of True indicating that a luminance saturation area exists, the flow proceeds to S511 and the parallax reliability estimating unit 103 outputs a determination result that a pair of short-second images is selected as parallax calculation images. This is because short-second images are less affected by luminance saturation than long-second images, and are therefore suitable for parallax calculation images. On the other hand, in a case of FALSE indicating that there is no luminance saturation area, the flow proceeds to S502.

In S502, the parallax reliability estimating unit 103 calculates motion blur reliability Conf_m for each of a pair of long-second image and a pair of short-second image. Then, using the motion blur determination threshold th_m, the parallax reliability estimating unit 103 determines whether or not there is a collation/reference area with Conf_m<th_m, that is, whether or not there is a collation/reference area with a large effect of motion blur and a small value of Conf_m. In a case of TRUE in which there is a collation/reference area that is significantly affected by motion blur (Conf_m<th_m), the flow proceeds to S511, and the determination result is that a pair of short-second images is selected as the parallax calculation image. This is because short-second images are less affected by motion blur than long-second images, and are therefore suitable for parallax calculation images. On the other hand, in a case of FALSE indicating that there is no collation/reference area that is significantly affected by motion blur, the flow proceeds to S503.

In S503, the parallax reliability estimating unit 103 calculates contrast reliability Conf_c for each of a pair of long-second image and a pair of short-second image, and compares the contrast reliability Conf_c_L for the short-second image and the contrast reliability Conf_c_H for the long-second image. The parallax reliability estimating unit 103 also compares contrast determination threshold th_c(0) as a predetermined value with a difference between the contrast reliabilities Conf_c_L and Conf_c_H.

If Conf_c_L−Conf_c_H≥th_c, that is, in a case where the contrast reliability of the short-second images is significantly higher than that of the long-second images, the flow proceeds to S511 and the parallax reliability estimating unit 103 outputs a determination result that selects the pair of short-second images as the parallax calculation images. If Conf_c_H−Conf_c_L≥th_c, that is, in a case where the contrast reliability of the long-second images is significantly higher than that of the short-second images, the flow proceeds to S512, and the parallax reliability estimating unit 103 outputs a determination result that selects the pair of long-second images as the parallax calculation images. If |Conf_c_L−Conf_c_H|≤th_c, that is, in a case where there is no significant difference in contrast reliability between the long-second images and the short-second images, the flow proceeds to S513 and the parallax reliability estimating unit 103 outputs a determination result that selects a pair of HDR images as the parallax calculation images.

The determination results of S511, S512 and S513 are passed to the image generation selecting unit 104 (S302 in FIG. 1). The image generation selecting unit 104 selects one of a pair of short-second images, a pair of long-second images, and a pair of HDR images as parallax calculation images based on the determination result. The stereo distance measuring unit 105 (S303 in FIG. 1) performs stereo distance measuring processing using the selected pair of images.

Determining a plurality of types of reliabilities in order and selecting a parallax calculation image in this way can expediate processing compared to the case of selecting a parallax calculation image after calculating all reliabilities. The contrast affects the accuracy of parallax calculation (or distance measurement) under similar conditions regardless of short-second images and long-second images, but affect short-second images are less affected by luminance saturation and motion blur than long-second images. Thus, the parallax calculation images may be selected based on the saturation reliability and the motion blur reliability before the parallax calculation images are selected based on the contrast reliability, as in this embodiment.

Third Embodiment

A third embodiment selects parallax calculation images using only the contrast reliability described in the first embodiment. The configuration of the distance measuring apparatus is the same as that of the distance measuring apparatus 100 illustrated in FIG. 1, and those elements, which are corresponding elements in the first embodiment, will be designated by the same reference numerals. The distance measuring processing is similar to that illustrated in the flowchart of FIG. 3 except for S301.

Figure 6:
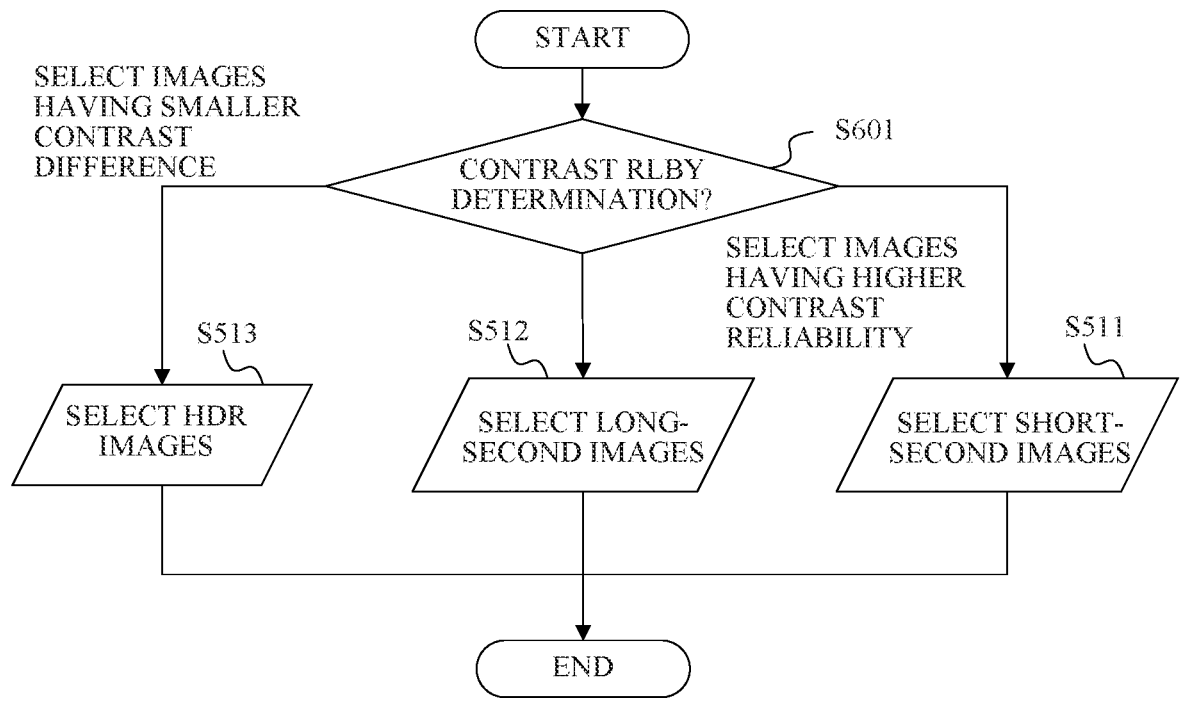
FIG. 6 is a flowchart illustrating reliability determining processing according to a third embodiment.

A flowchart in FIG. 6 illustrates reliability determining processing executed by the parallax reliability estimating unit 103 according to this embodiment instead of S301 in FIG. 3.

In S601, the parallax reliability estimating unit 103 calculates the contrast reliability Conf_c for each of a pair of long-second images and a pair of short-second images as input images, similarly to S503 in FIG. 5, and compares the contrast reliabilities Conf_c_L and Conf_c_H of the long-second images and short-second images. The parallax reliability estimating unit 103 also compares the contrast determination threshold th_c(0) with a difference between the contrast reliabilities Conf_c_L and Conf_c_H.

If Conf_c_L−Conf_c_H≥th_c, the flow proceeds to S511 and the parallax reliability estimating unit 103 outputs a determination result that selects the pair of short-second images as the parallax calculation images. If Conf_c_H−Conf_c_L≥th_c, the flow proceeds to S512 and the parallax reliability estimating unit 103 outputs a determination result that selects a pair of long-time images as the parallax calculation images. If |Conf_c_L−Conf_c_H|<th_c, the flow proceeds to S513 and the parallax reliability estimating unit 103 outputs a determination result that selects a pair of HDR images as the parallax calculation images.

Thus selecting the parallax calculation images using only the contrast reliability can make a calculation amount much smaller than that of each of the first and second embodiments. The influence of luminance saturation and motion blur depends on an imaging scene such as an imaging location, time, and object. On the other hand, the contrasts of both short-second and long-second images are always affected by the object and ambient light under the same conditions. Hence, the parallax calculation image may be selected based only on the contrast reliability.

Fourth Embodiment

A fourth embodiment selects parallax calculation images using the saturation reliability and contrast reliability described in the first embodiment. The configuration of the distance measuring apparatus is the same as that of the distance measuring apparatus 100 illustrated in FIG. 1, and those elements, which are corresponding elements in the first embodiment, will be designated by the same reference numerals. The distance measuring processing is similar to that illustrated in the flowchart of FIG. 3 except for S301.

Figure 7:
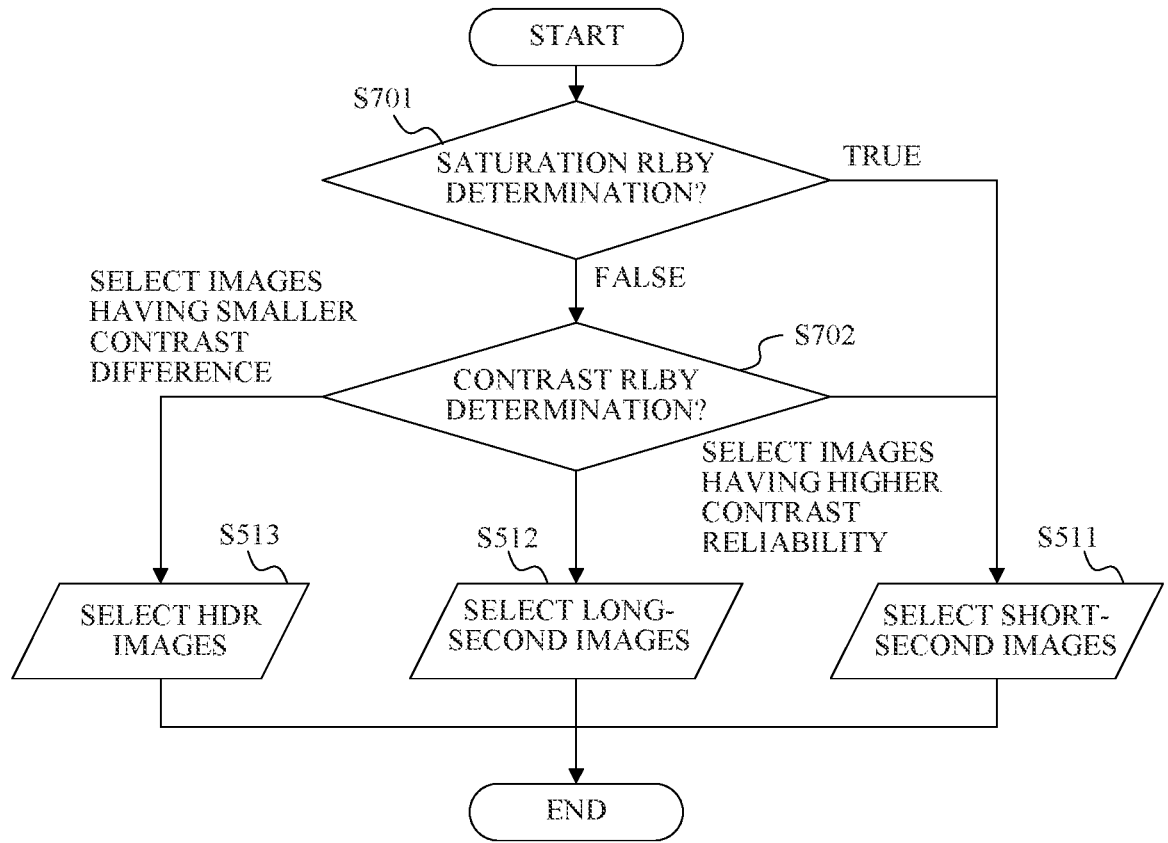
FIG. 7 is a flowchart illustrating reliability determining processing according to a fourth embodiment.

A flowchart in FIG. 7 illustrates reliability determining processing executed by the parallax reliability estimating unit 103 according to this embodiment instead of S301 in FIG. 3.

In S701, the parallax reliability estimating unit 103 calculates the saturation reliability Conf_s for each of a pair of long-second images and a pair of short-second images as input images, similarly to S501 in FIG. 5 determines whether there is a match/reference area with Conf_s=0 in each of the images. In a case of True indicating that a luminance saturation area exists, the flow proceeds to S511 and the parallax reliability estimating unit 103 outputs a determination result that selects the pair of short-second images as the parallax calculation images. In a case of FALSE indicating that there is no luminance saturation area, the flow proceeds to S702.

In S702, the parallax reliability estimating unit 103 calculates the contrast reliability Conf_c for each of the pair of long-second images and the pair of short-second images as input images, similarly to S503 in FIG. 5, and compares the contrast reliabilities Conf_c_L and Conf_c_H of the long-second images and the short-second images. The parallax reliability estimating unit 103 also compares the contrast determination threshold th_c(0) with a difference between the contrast reliabilities Conf_c_L and Conf_c_H.

If Conf_c_L−Conf_c_H≥th_c, the flow proceeds to S511 and the parallax reliability estimating unit 103 outputs a determination result that selects the pair of short-second images as the parallax calculation images. If Conf_c_H−Conf_c_L≥th_c, the flow proceeds to S512 and the parallax reliability estimating unit 103 outputs a determination result that selects the pair of long-time images as the parallax calculation images. If |Conf_c_L−Conf_c_H|<th_c, the flow proceeds to S513 and the parallax reliability estimating unit 103 outputs a determination result that selects a pair of HDR images as the parallax calculation images.

In a case where there is a luminance saturation area within the collation/reference area for calculating the contrast reliability, the contrast of the object cannot be correctly calculated and erroneous determination may occur. Therefore, this embodiment can prevent erroneous determination of the contrast reliability due to luminance saturation, and can obtain a calculation amount reducing effect.

Fifth Embodiment

A fifth embodiment selects parallax calculation images using the saturation reliability and the contrast reliability, and then selects the parallax calculation images based on the motion blur reliability in a case where the parallax calculation images cannot be selected by the contrast reliability. The configuration of the distance measuring apparatus is the same as that of the distance measuring apparatus 100 illustrated in FIG. 1, and those elements, which are corresponding elements in the first embodiment, will be designated by the same reference numerals. The distance measuring processing is similar to that illustrated in the flowchart of FIG. 3 except for S301.

Figure 8:
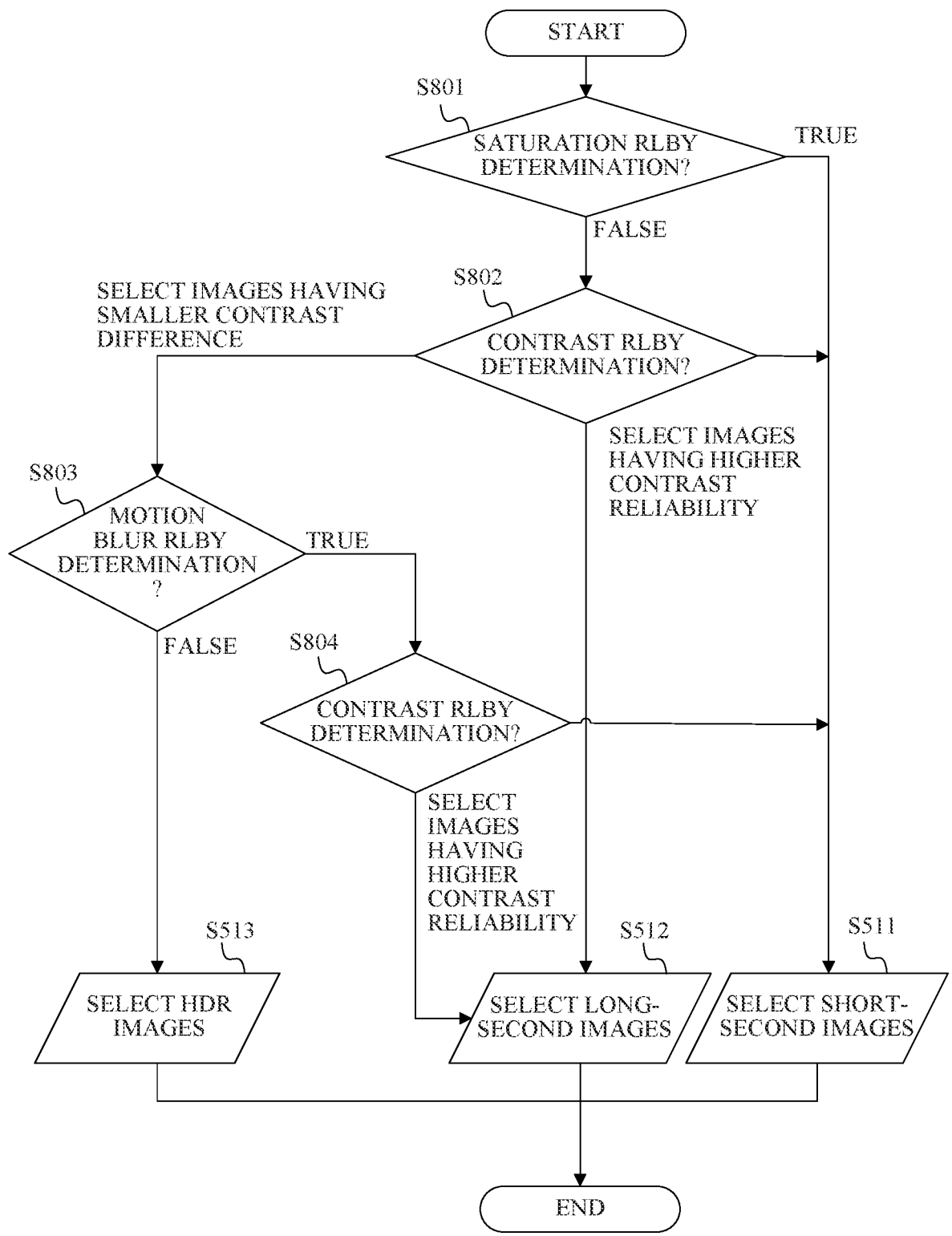
FIG. 8 is a flowchart illustrating reliability determining processing according to a fifth embodiment.

A flowchart in FIG. 8 illustrates reliability determining processing executed by the parallax reliability estimating unit 103 according to this embodiment instead of S301 in FIG. 3.

In S801, the parallax reliability estimating unit 103 calculates the saturation reliability Conf_s for each of a pair of long-second image and a paired short-second image, similarly to S501 in FIG. 5 determines whether or not there is a collation/reference area with Conf_s=0 in. In a case of True indicating that a luminance saturation area exists, the flow proceeds to S511 and the parallax reliability estimating unit 103 outputs a determination result that selects the pair of short-second images as the parallax calculation images. In a case of FALSE indicating that there is no luminance saturation area, the flow proceeds to S802.

In S802, the parallax reliability estimating unit 103 calculates the contrast reliability Conf_c for each of the pair of long-second image and the pair of short-second image as input images, similarly to S503 in FIG. 5, and compares the contrast reliabilities Conf_c_L and Conf_c_H of the long-second images and the short-second images. The parallax reliability estimating unit 103 also compares the contrast determination threshold th_c(0) with a difference between the contrast reliabilities Conf_c_L and Conf_c_H. If Conf_c_L−Conf_c_H≥th_c, the flow proceeds to S511 and the parallax reliability estimating unit 103 outputs a determination result that selects a pair of short-second images as the parallax calculation images. If Conf_c_H−Conf_c_L≥th_c, the flow proceeds to S512 and the parallax reliability estimating unit 103 outputs a determination result that selects a pair of long-time images as the parallax calculation images. If |Conf_c_L−Conf_c_H|<th_c, the flow proceeds to S803.

In S803, the parallax reliability estimating unit 103 calculates the motion blur reliability Conf_m for each of the pair of long-second image and the pair of short-second image, similarly to S502 in FIG. 5. Then, using the motion blur determination threshold th_m, the parallax reliability estimating unit 103 determines whether or not there is a collation/reference area of Conf_m<th_m. In a case where it is TRUE that there is a collation/reference area significantly affected by motion blur (Conf_m<th_m), the flow proceeds to S804. In a case of FALSE indicating that there is no collation/reference area that is significantly affected by motion blur, the flow proceeds to S513 and the parallax reliability estimating unit 103 outputs a determination result that selects a pair of HDR images as the parallax calculation image.

In S804, the parallax reliability estimating unit 103 again compares the contrast reliabilities Conf_c_L and Conf_c_H of the short-second images and the long-second images. In a case where the contrast reliability Conf_c_L of the short-second images is higher, the flow proceeds to S511 and the parallax reliability estimating unit 103 outputs a determination result that selects the pair of short-second images as the parallax calculation images. In a case where the contrast reliability Conf_c_H of the long-second images is higher, the flow proceeds to S512 and the parallax reliability estimating unit 103 outputs a determination result that selects the pair of long-second image as the parallax calculation image.

Combining long-second images and short-second images that include an image that is significantly affected by motion blur causes artifacts around the object that is significantly affected by motion blur and the parallax amount calculating accuracy may lower. Thus, this embodiment basically selects the parallax calculation images using the luminance saturation reliability and the contrast reliability and selects a pair of HDR images suitable to calculate the parallax amount and to prevent the artifacts in a case where the parallax calculation images cannot be selected by the luminance saturation reliability and the contrast reliability.

Sixth Embodiment

Figure 10A:
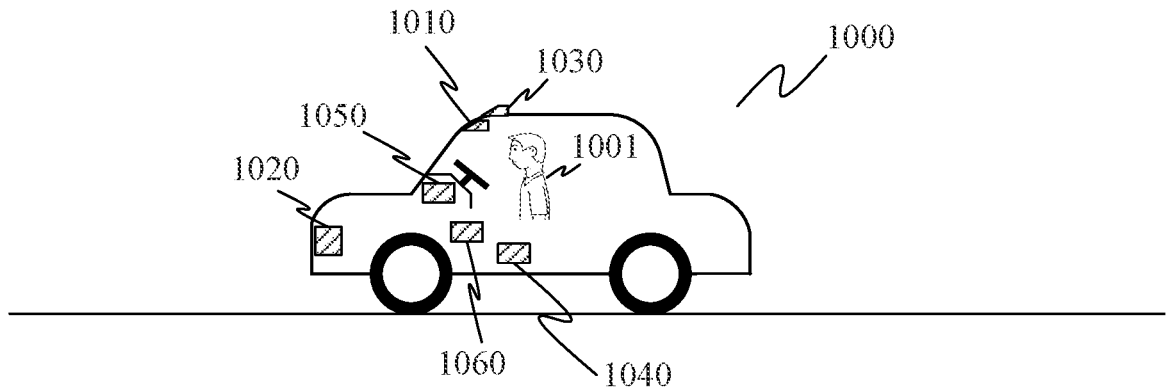
FIGS. 10A and 10B illustrate the configuration of a moving object according to a seventh embodiment.
Figure 10B:
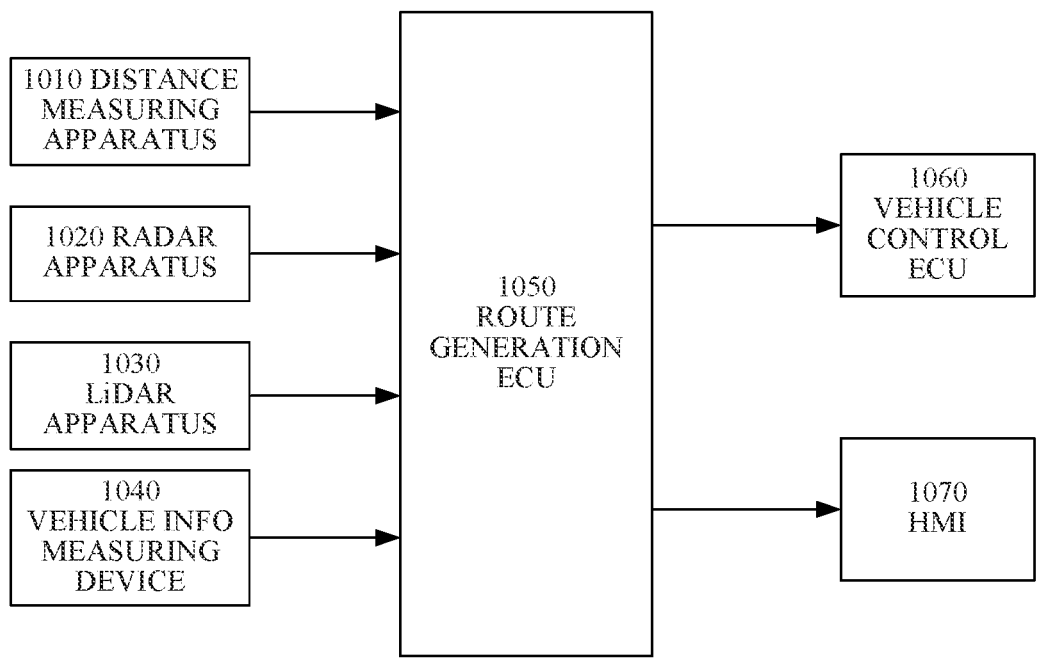

While the first embodiment configures the stereo camera using the two camera units 111 and 112, but this example configures a stereo camera using a single camera unit. FIGS. 10A and 10B also illustrate the configuration of a camera unit 911 according to this embodiment. This embodiment is different from the first embodiment in the configuration of an image sensor 913 which enables imaging-surface phase-difference distance measuring using a pupil division method. In FIGS. 10A and 10B, a z-axis direction indicates an optical axis direction in which an optical axis 920 extends, and x-axis direction and y-axis direction indicate two directions orthogonal to the optical axis 920 and perpendicular to each other.

Figure 9A:
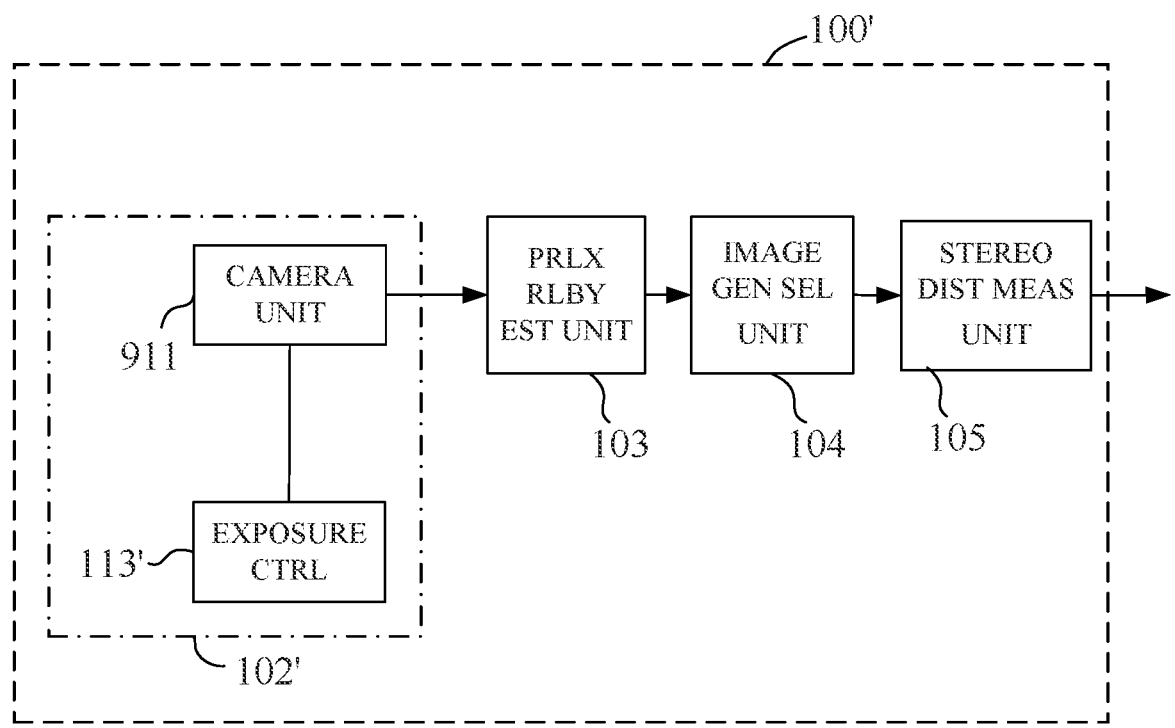
FIGS. 9A, 9B, 9C, and 9D illustrate the configurations of a distance measuring apparatus and an image sensor according to a sixth embodiment.
Figure 9B:
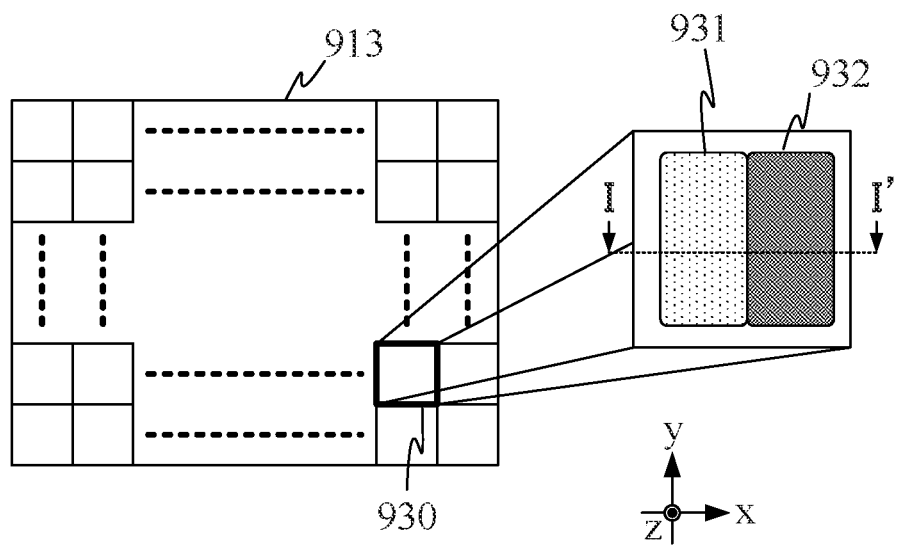

FIG. 9B illustrates an xy section of the image sensor 913. The image sensor 913 includes a plurality of unit pixels 930 in the x direction and the y direction. The light receiving layer of the unit pixel 930 includes a first photoelectric converter 931 and a second photoelectric converter 932 as two photoelectric converters.

Figure 9C:
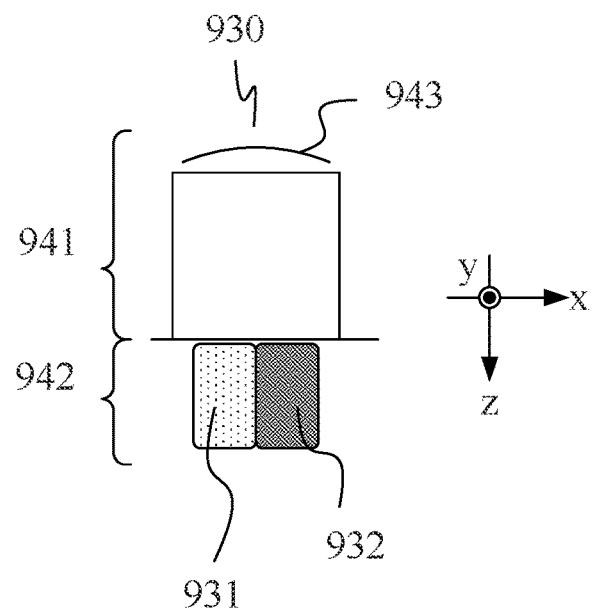

FIG. 9C illustrates an I-I' section of one unit pixel 930. The unit pixel 930 has a light guide layer 941 and a light receiving layer 942. The light guide layer 941 has a microlens 943 for efficiently guiding light beams incident on the unit pixel 930 to the photoelectric converters 931 and 932. Although not illustrated, the light guide layer 941 also includes a color filter for passing light in a predetermined wavelength band, wiring for driving pixels and reading signals, and the like. The first and second photoelectric converters 931 and 932 that photoelectrically convert light incident through the light guide layer 941 are disposed in the light receiving layer 942.

The camera unit 911 including a single image sensor 913 having such a unit pixel structure and a single imaging optical system 912 obtains a first image and a second image with different viewpoints by the pupil division method.

Figure 9D:
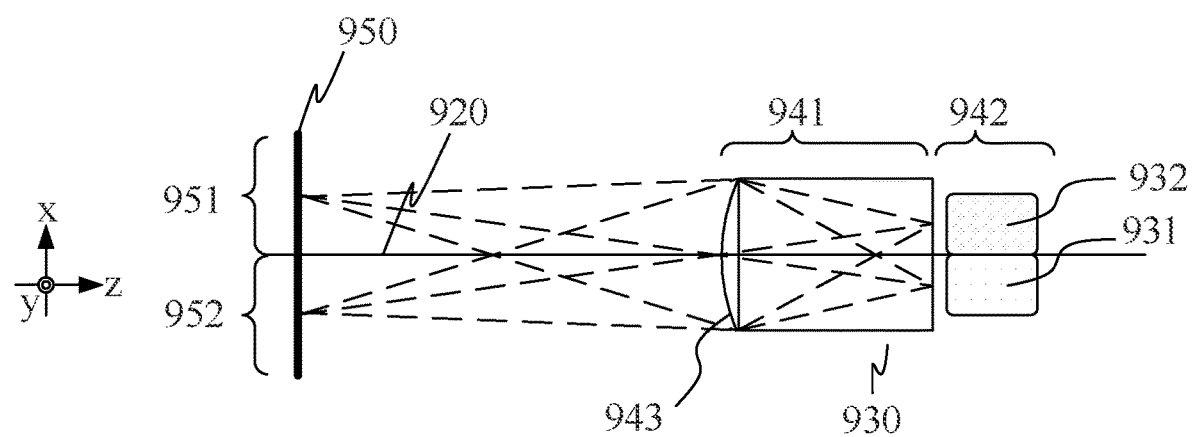

FIG. 9D illustrates the principle of the pupil division method. FIG. 9D illustrates an exit pupil 950 of the imaging optical system 912 and a representative unit pixel 930 near the center image height among the plurality of unit pixels 930 in the image sensor 913. The microlens 943 in the unit pixel 930 is disposed such that the exit pupil 950 and the light receiving layer 942 are in an optically conjugate relationship. As a result, a light beam passing through the first pupil area 951, which is a partial pupil area included in the exit pupil 950, enters the first photoelectric converter 931, and a light beam passing through the second pupil area 952, which is another partial pupil area, which is another partial pupil area included in the exit pupil 950, enters the second photoelectric converter 932. Even if the position of the unit pixel 930 is located at a peripheral image height, a principal ray tilts and enters the unit pixel 930, but a corresponding relationship between the partial pupil area, the light beam, and the photoelectric converter does not change.

The plurality of unit pixels 930 are arranged in the image sensor 913, and a first image is generated by reading and combining signals generated by the photoelectric conversion in the first photoelectric converter 931 of each unit pixel. Similarly, a second image is generated by reading and combining signals generated by the photoelectric conversion in the second photoelectric converter 932 of each unit pixel.

A distance measuring apparatus 100' according to this embodiment includes an exposure control image acquiring unit 102' including the camera unit 911 and an exposure control unit 113' described above, the parallax reliability estimating unit 103, image generation selecting unit 104, and a stereo distance measuring unit 105 illustrated in FIG. 1.

The exposure control unit 113' controls the exposure amount of the image sensor 913 by the method described in the first embodiment, thereby producing a pair of long-second images as the first and second exposure images and a pair of short-second images as the first and second exposure images.

The distance measuring apparatus 100' according to this embodiment calculates a parallax amount and generates a distance image by performing the processing described in any one of the first to fifth embodiments using the pair of long-second images and the pair of short-second images obtained from the single camera unit 911.

Using a single camera unit as in this embodiment can make the influence of geometric shifts other than parallax between a pair of images smaller than using two camera units. Therefore, this embodiment can perform distance measurement with higher accuracy by properly selecting a pair of images suitable to calculate a parallax amount from a plurality of pairs of images with different exposure conditions.

Seventh Embodiment

FIG. 10A illustrates a vehicle 1000 as a movable body, and FIG. 10B illustrates a control system mounted on the vehicle 1000. The movable object is not limited to an automobile, and may be a train, an airplane, a ship, a small mobility vehicle, or a robot such as an Automatic Guided Vehicle (AGV).

In FIG. 10A, the vehicle 1000 includes a distance measuring apparatus 1010 (100, 100'), a millimeter wave radar apparatus 1020, a Light Detection and Distance measuring (LiDAR) apparatus 1030, and a vehicle information measuring device 1040 described in the first to sixth embodiments. The vehicle 1000 also includes a route generation Electronic Control Unit (ECU) 1050 and a vehicle control ECU 1060. The route generation ECU 1050 and the vehicle control ECU 1060 may include a CPU.

The distance measuring apparatus 1010 images the surrounding environment including a road for the vehicle 1000, and generates image information including pairs of images (long-second images, short-second images, and HDR images) having parallax. The distance measuring apparatus 1010 also generates information about a distance image (referred to as distance information hereinafter) including information on a distance to an object for each pixel of an image sensor. The distance measuring apparatus 1010 outputs the image information and distance information to route generation ECU 1050. The distance measuring apparatus 1010 is disposed near an upper end of the windshield of vehicle 1000 as illustrated in FIG. 10A, and images an area in a predetermined angular range (imaging angle of view) toward the front of vehicle 1000.

As described in the first embodiment, the information about the distance may be information indicating the distance itself, or information that can be converted into the distance. Information in which distances are assigned to predetermined integer values may be output to the route generation ECU 1050. Information about an optically conjugate distance value that can be converted into the distance to the object (defocus amount from the image sensor to a conjugate point) and a distance from the optical system to the conjugate point (distance from the image side principal point to the conjugate point) may be output to the route generation ECU 1050. The vehicle information measuring device 1040 measures a driving speed of the vehicle 1000 and detects a steering angle, and outputs measurement information indicating them to the route generation ECU 1050.

The route generation ECU 1050 is configured using a logic circuit. The route generation ECU 1050 acquires measurement information from the vehicle information measuring device 1040, image information and distance information from the distance measuring apparatus 1010, distance information from the radar apparatus 1020 and distance information from the LiDAR device 1030. Based on the acquired information, the route generation ECU 1050 generates target route information about at least one of the target driving locus and the target driving speed of the vehicle 1000 and sequentially outputs the target route information to the vehicle control ECU 1060.

Based on the target route information, the vehicle control ECU 1060 performs driving control to control the rotation speed of the engine or motor of the vehicle 1000 and the rotation angle of the steering wheel so that the driving speed and steering angle of the vehicle 1000 reach control target values. An in-vehicle system as a mobile body control system includes the distance measuring apparatus 1010 and the vehicle control ECU 1060.

The vehicle 1000 may include a Human Machine Interface (HMI) 1070 that displays an image or notifies the driver 1001 by sound. In this case, target route information generated by route generation ECU 1050 can be displayed or notified to driver 1001 through the HMI 1070.

The distance measuring apparatus 1010 selects a pair of images suitable to calculate a parallax amount from a plurality of pairs of images with different exposure conditions, and outputs highly accurate distance information to the route generation ECU 1050. Thereby, the accuracy of the target route information generated by the route generation ECU 1050 is improved, and safer vehicle driving control can be achieved.

The distance measuring apparatus 1010 mounted on a movable body such as a vehicle images a scene in which luminance saturation is likely to occur, such as a tunnel exit and headlights of oncoming vehicles at night, and an object with large motion blurs such as oncoming vehicles. Even in capturing such a scene or object, by selecting a pair of images suitable to calculate a parallax amount for each angle of view (collation/reference area) of the pair of images as described in the first to sixth embodiments, highly accurate distance measuring processing can be performed with reduced influence of luminance saturation and motion blur.

The vehicle control ECU 1060 may determine whether the distance to the object is within a predetermined distance range using the distance information obtained by the distance measuring apparatus 1010. The vehicle control ECU 1060 determines that there is a "likelihood of collision" in a case where the object exists within a predetermined distance range, and determines that there is no likelihood of collision in a case where the object does not exist within the predetermined distance. In a case where vehicle control ECU 1060 determines that there is a likelihood of a collision, the vehicle control ECU 1060 may control a brake and steering wheel of the vehicle 1000 or issue a warning to a driver 1001 based on the determination result. The warning includes displaying warning information on the display screen and vibrating the seat belt and steering wheel.

In a case where the vehicle 1000 collides with an object, a notification unit may notify a notification destination such as a manufacturer (manufacturer) or a sales agent (dealer) of the movable body to that effect. The notification unit, for example, may use one that transmits information about the collision between the vehicle 1000 and the object to a preset external notification destination by e-mail or the like.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can select a proper pair of images from a plurality of pairs of images having mutually different exposure conditions and perform good distance measurement.

This application claims the benefit of Japanese Patent Application No. 2022-171112, filed on Oct. 26, 2022, which is hereby incorporated by reference herein in its entirety.

What is claimed is:

1. An information processing apparatus comprising:
a memory storing instructions; and
a processor configured to execute the instructions to:
acquire a first pair of parallax images and a second pair of parallax images, each pair being a group of images having parallax with each other and captured by an imaging unit under different exposure conditions, wherein the first pair of parallax images is captured under a first exposure condition and the second pair of parallax images is captured under a second exposure condition that is different from the first exposure condition,
acquire reliability, which indicates an accuracy of a parallax amount, for each of the first pair of parallax images and the second pair of parallax images, wherein the reliability is obtained by combining at least: reliability regarding a luminance saturation, reliability regarding a motion blur, and reliability regarding a contrast,
select one pair of parallax images from among the first pair of parallax images and the second pair of parallax images, based on the reliability, so as to generate information about a distance, without combining the partial blocks from different pairs of images, and
calculate the parallax amount from only the selected pair of parallax images and generate the information about the distance based on the parallax amount.

2. The information processing apparatus according to claim 1, wherein the processor is configured to control an exposure condition of the imaging unit.

3. The information processing apparatus according to claim 1, wherein the processor is configured to select one of the first pair of parallax images, the second pair of parallax images, and a combined image obtained by combining the first pair of parallax images and the second pair of parallax images as a third pair of parallax images that are used to generate the information about the distance.

4. The information processing apparatus according to claim 1, wherein the processor is configured to select the third pair of parallax images that are used to generate the information about the distance based on a reliability obtained by combining the reliability about the contrast, the reliability regarding the luminance saturation, and the reliability about the motion blur.

5. The information processing apparatus according to claim 1, wherein the processor is configured to select the third pair of parallax images that are used to generate the information about the distance, using the reliability about the luminance saturation, the reliability about the motion blur, and the reliability about the contrast in this order.

6. The information processing apparatus according to claim 1, wherein the processor is configured to select the third pair of parallax images that are used to generate the information about the distance, using the reliability about the luminance saturation and the reliability abound the contrast in this order.

7. The information processing apparatus according to claim 1, wherein in a case where a difference in the reliability about the contrast between the first pair of parallax images and the second pair of parallax images is smaller than a predetermined value, the processor is configured to select a combined pair of parallax images as the third pair of parallax images that are used for generating the information about the distance.

8. The information processing apparatus according to claim 1, wherein the processor is configured to acquire the first pair of parallax images and the second pair of parallax images by changing an exposure time of an image sensor in the imaging unit.

9. The information processing apparatus according to claim 1, wherein the processor is configured to acquire the first pair of parallax images and the second pair of parallax images by exposing, with same exposure times, first pixels and second pixels having different exposure sensitivities provided in an image sensor in the imaging unit.

10. The information processing apparatus according to claim 1, wherein the imaging unit includes two imaging units spaced by a base line length and each having an imaging optical system and an image sensor.

11. The information processing apparatus according to claim 1, wherein the imaging unit has a single imaging optical system and a single image sensor having a pair of photoelectric converters for each pixel.

12. A movable body control system comprising:
    the information processing apparatus according to claim 1, mounted on a movable body; and
    a control unit configured to control movement of the movable body based on the information about the distance.

13. The movable body control system according to claim 12, wherein the control unit determines a likelihood of collision between the movable body and an object based on the information about the distance.

14. The movable body control system according to claim 13, wherein the control unit is configured to control a brake or steering wheel of the movable body in a case where the control unit determines that there is the likelihood of collision between the movable body and the object.

15. The movable body control system according to claim 13, wherein the control unit is configured to warn a driver of the movable body in a case where the control unit determines that there is the likelihood of collision between the movable body and the object.

16. The movable body control system according to claim 13, further comprising a notification unit configured to notify outside of information about the collision between the movable body and the object.

17. The movable body control system according to claim 12,
    wherein the movable body is configured to hold the information processing apparatus and the control unit and is movable with the information processing apparatus and the control unit.

* * * * *